Aug. 18, 1964  V. L. ROGALLO  3,144,999
PROPELLER BLADE LOADING CONTROL
Filed Jan. 24, 1962  2 Sheets-Sheet 1

INVENTOR.
VERNON L. ROGALLO
BY
ATTORNEYS

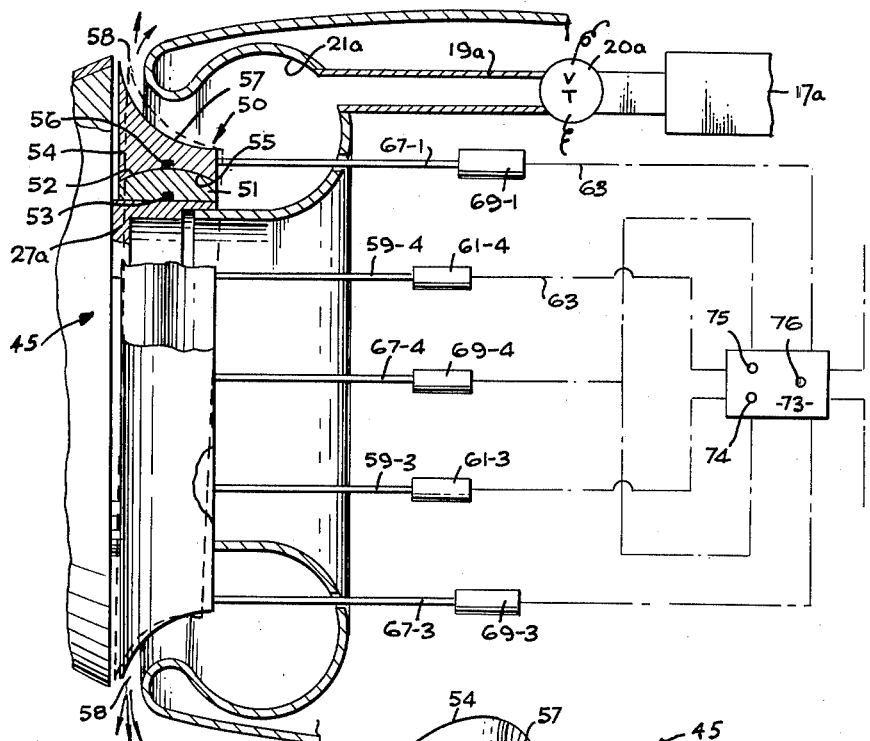
Fig. 4
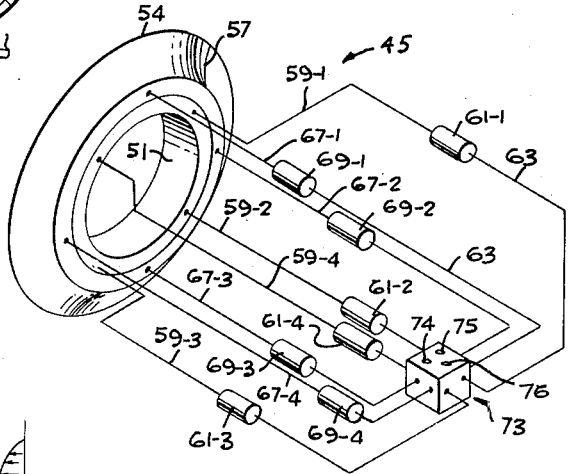
Fig. 5
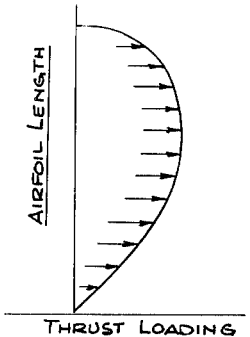
Fig. 7 — Thrust Loading
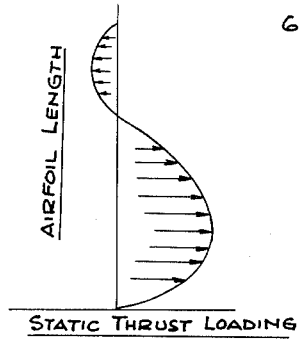
Fig. 6 — Static Thrust Loading
INVENTOR.
VERNON L. ROGALLO
BY
ATTORNEYS 3,144,999
PROPELLER BLADE LOADING CONTROL
Vernon L. Rogallo, Los Altos, Calif., assignor to the United States of America as represented by the Administrator of the National Aeronautics and Space Administration
Filed Jan. 24, 1962, Ser. No. 168,560
8 Claims. (Cl. 244—51)
(Granted under Title 35, U.S. Code (1952), sec. 266)

The invention described herein may be manufactured and used by or for the Government of the United States of America for governmental purposes without the payment of any royalties thereon or therefor.

This invention relates to a system for controlling the load on a propeller blade, and more particularly to the control of propeller blade loading by directing a fluid stream against the flow down through the propeller.

It is generally known that the fluid flow through an axial type propeller, at takeoff conditions, is such that it is directed inwardly from the tip of the propeller creating a high velocity flow over the engine nacelle or plane fuselage. This is undesirable since the increased and accelerated flow over the nacelle or fuselage increases drag. Furthermore, because of this flow configuration, the portion of the propeller adjacent to the spinner must do the work on the fluid stream, it being well known that the propeller operates inefficiently under these conditions.

Previously, structures such as vanes have been placed aft of the propeller or a shroud enclosing the propeller to provide a duct to create a barrier which will force the fluid stream to be acted upon by the efficient portion of the propeller which is at a diameter approximately seven-tenths of the distance from the spinner toward the propeller tip (at the 70% station). Although this arrangement increases the efficiency of the propeller, the accomplishment is offset by the increased drag produced by the vanes or shrouds at high forward aircraft speeds.

A method employed to control thrust at low speeds is that of using articulated propeller blades with selective cyclic pitch mechanisms. This arrangement has the disadvantage of not being sufficiently flexible in design to meet a wide range of operating conditions. This type of propeller is limited to use with air vehicles having a very low forward speed and is also usually complex, creating excessive vibration and therefore a maintenance problem.

This invention avoids many difficulties of prior art structures by utilizing a fluid stream which is directed generally laterally of the fluid flow through the propeller. The fluid flow through the propeller is forced toward the tip of the propeller by the laterally directed stream where the fluid flow through the propeller is worked upon by the efficient portion of the propeller. Since there is no physical structure, such as a vane, drag is not increased. On the contrary, drag is decreased since the flow over the nacelle or fuselage is decreased, this air being directed away from these structures by the lateral fluid stream. The lateral fluid stream can be directed by a nozzle arrangement which is mechanically very simple, compared to a propeller system utilizing articulated blades with selective cyclic pitch mechanisms.

It is therefore an object of this invention to provide a control for propeller blade loading which will increase thrust.

Yet another object of this invention is to provide a control for propeller blade loading which will reduce slipstream velocity and thus drag on a nacelle or fuselage afterbody.

Another object of this invention is to provide a control for propeller blade loading which will alleviate recirculation flow of fluid through the propeller utilized in a vertical takeoff application.

Still another object of this invention is to provide a control for propeller blade loading which will relieve blade loading instability during vertical descent conditions.

Another object of this invention is to provide a control for propeller blade loading which will lessen or eliminate stall flutter.

Still another object of this invention is to provide a control for propeller blade loading which will produce rapid thrust control.

Yet another object of this invention is to provide a propeller blade loading control which can be utilized to influence lateral direction in a multiengine vertical takeoff aircraft.

An object of this invention is to provide a propeller blade loading control which will reduce slipstream rotation for single rotation propellers and thereby increase efficiency.

Another object of this invention is to provide a propeller blade loading control that will allow geometric blade pitch distribution change (i.e., twist) and blade section profiles to provide improved efficiency at cruise speed.

Still another object of this invention is to provide a propeller blade loading control which will produce an unsymmetrical fluid stream around the propeller disc to relieve or eliminate all propeller forces and moments except thrust and torque, resulting in the ability to use smaller aircraft control surfaces, relieve vibratory stresses and provide for more uniform flow over afterbodies or wings to reduce drag.

A further object of the invention is to provide a propeller blade loading control which can produce an unsymmetrical fluid stream about the propeller disc to induce forces and moments for directional control of a vertical takeoff and landing aircraft.

These and other objects and advantages of this invention will become more apparent upon reading the specification in conjunction with the accompanying drawings.

FIG. 4 is a fragmentary side elevational view of an engine and propeller, with sections cut away, to reveal a modified propeller blade loading system;

FIG. 5 is a perspective view showing schematically the actuator and valve arrangement for operating the modified propeller blade loading control;

FIG. 6 is a graphic representation of propeller blade thrust loading at static conditions;

FIG. 7 is a graphic representation of propeller blade thrust loading at cruise speed conditions.

Basically, this invention relates to a system for controlling propeller blade loading. This is accomplished by placing a nozzle adjacent to, but aft of, the propeller so directed that a fluid stream is discharged generally laterally of the fluid flow through the propeller. The nozzle is of a ring-like configuration which is capable of discharging a continuous circumferential fluid stream. A restrictor ring forms a part of the nozzle and can be moved by mechanical structure to regulate the fluid flow from the nozzle. In a modified form of the invention the restrictor ring is a two-piece structure, the one piece being mounted universally with respect to the other, such that it may be canted to provide an uneven discharge from the nozzle and thereby an uneven thrust loading utilized to accomplish certain of the objects of the invention.

Figure 1:
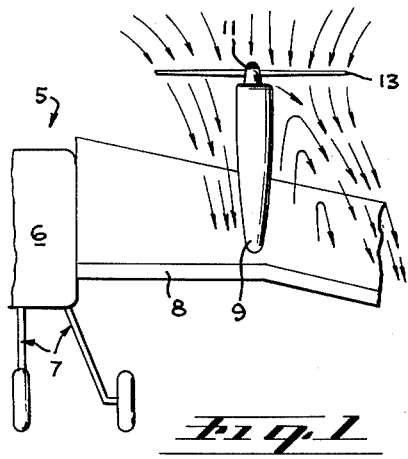
FIG. 1 is a fragmentary end elevational view of a vertical takeoff and landing aircraft showing the effect of unsymmetrical flowing by the control system on the fluid stream passing through a propeller.

Referring now more specifically to the details of the invention, FIG. 1 shows an aircraft 5 to which the invention could have application. The aircraft 5 is of the vertical takeoff and landing variety; however, it is to be understood that within the broadest aspect of the invention the control system has application to other types of propeller driven aircraft as well as any axial type propeller which would include a fan or compressor operating in a compressible or incompressible fluid. The aircraft 5 has a fuselage or body 6 to which is connected landing gear 7. Wings 8 are connected to the fuselage and carry engines 9 having spinners 11 to which are fixed propellers 13. For simplicity, one wing 8, engine 9 and their associated parts are illustrated.

Figure 3:
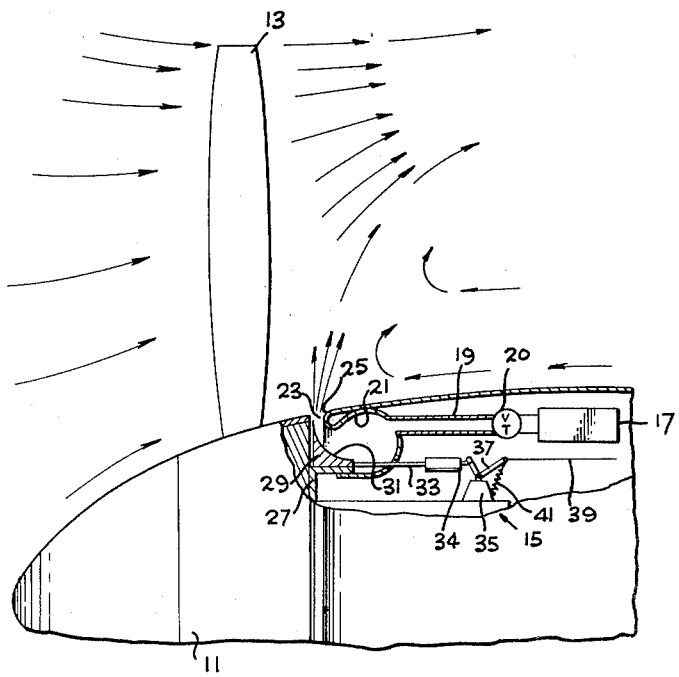
FIG. 3 is a fragmentary side elevational view of an engine, partially cut away, to reveal a propeller loading control system.

FIG. 3 best illustrates the basic control system, generally designated 15. Located aft of the propeller and spinner is an air compressor 17 of conventional design. Ducting 19 is connected to the air compressor and to a manifold 21. The manifold 21 has the general configuration of a torus. The ducting 19 is connected to the manifold 21 at various points about its circumference to equalize pressure within the manifold. Throttle valve 20 is placed in the ducting 19 to control the pressure in manifold 21. The manifold is split along the leading edge and the upper portion is connected to the engine nacelle 9. The inner portion of the manifold is straightened and connected to a bearing annulus 27 which lies partially within the manifold. The bearing annulus is generally L-shaped in cross sectional configuration, the one surface thereof providing an ideal connection point for the inner portion of the manifold. Both the manifold 21 and bearing annulus 27 are held in position by bracing (not shown) of conventional design which is connected between these members and the engine, also omitted for clarity.

A restrictor ring 29 surrounds the bearing annulus and is journalled thereupon. A seal (not shown) is placed between these surfaces to eliminate fluid bypass in this area. It is capable of movement both toward and away from the manifold 21. A curved closure surface 31 is formed on the restrictor ring 29. This surface together with the outer portion of the manifold 21 form a nozzle 23. Fluid flow from the nozzle may be restricted or terminated by movement of the restrictor ring 29.

The restrictor ring 29 may be moved mechanically by a bell crank and cable arrangement. These mechanisms are located at 90-degree intervals about the trailing edge of the manifold 21. Since they are substantially identical in configuration, only one unit will be explained in detail. A link 33 is connected to the end of the restrictor ring 29, passes through an aperture in the manifold 21, and connects to a flexible coupling 34 which in turn connects to the short arm of a bell crank 37. An appropriate seal (not shown) surrounds the link 33 to prevent fluid escape from the manifold about the link aperture. The bell crank 37 is mounted on a fulcrum 35 which is conventionally supported on the engine 9. The long arm of the bell crank 37 is connected to control cable 39 which is operative from the cockpit through a pulley system (not shown). The control cables connected to the various bell crank arrangements may be integrated with a master cable to simplify the system. Obviously, it is within the purview of the invention, to operate the control cables by power means. Under operating conditions the restrictor ring 29 is extended when the manifold 21 is pressurized. Otherwise, a compression spring 41 located between the fulcrum 35 and the bell crank 37 extends the restrictor ring 29, upon release of the control cable.

The modified control assembly 45 is illustrated in FIGS. 4 and 5. The air compressor 17a, ducting 19a, throttle valve 20a, manifold 21a and bearing annulus 27a are similar to that of the complementary parts of control system 15. Therefore these members will not again be explained in detail.

The control assemblies differ in the arrangement of the restrictor rings, in the modified form being designated 50. The restrictor ring 50 is a two-piece member, having an inner portion 51 which is journalled on the bearing annulus 27a. It has a convex surface 52 formed on its outer periphery. The inner periphery of the inner portion is provided with an O-ring seal 53 which functions to prevent escape of fluid from the manifold 21a. The outer portion 54 surrounds the inner portion 51 and has a concave surface 55 which matches the convex surface 52. A seal 56 is located between the concave and convex surfaces to prevent fluid leakage. The outer periphery of the outer portion 54 is curved to form a closure surface 57. The closure surface 57 together with the extended portion of the manifold 21a form the nozzle 58. As shown in phantom in FIG. 4, the outer portion 54 is free to move universally about the inner portion 51. It is also evident that when the inner portion 51 is moved on the bearing annulus 27a, the outer portion 54 will also be moved. A series of arms 59–1, 59–2, 59–3 and 59–4 (FIG. 5) are connected at 90-degree intervals to the inner end of the restrictor ring inner portion 51. These arms are in turn connected to actuators 61–1, 61–2, 61–3 and 61–4 which are supported in a conventional manner by the engine. Fluid lines 63 are connected between the actuators 61–1 through 4 and a valve control arrangement 73. The valve control 73 is connected with a conventional fluid supply (not shown).

Rods 67–1, 67–2, 67–3 and 67–4 are connected to the inner end of the restrictor ring outer portion 54, and to fluid motivators 69–1, 69–2, 69–3 and 69–4 which are supported by the engine 9. The motivators 69–1 through 4 are inner-connected with the control valve 73 by fluid lines 71. The rods 67–1 through 4 and motivators 69–1 through 4 are positioned at 90-degree intervals about the restrictor outer ring portion 54, and disposed at intervals intermediate the actuators 61–1 through 4 and their associated parts.

The actuators 61–1 through 4 and motivators 69–1 through 4 are controlled by extend button 74, retract button 75, and multiposition lever 76 respectively, all of conventional design.

*Operation*

Referring first to the control system 15 (FIG. 3) the springs 41 constantly urge the bell cranks 37 in such direction that the restrictor ring 29 is moved away from the manifold 21 to open the nozzle 23. The nozzle 23 is closed by actuating the control cables 39 which operate the bell cranks 37 to draw the retrictor ring 29 toward the manifold 21. As the restrictor ring 29 moves toward the manifold 21 the flow of fluid from the nozzle is restricted. When the restrictor ring 29 abuts the manifold 21 the nozzle is completely closed and flow terminated. It can be seen that with this arrangement the flow through the nozzle can be regulated to provide degrees of blowing laterally against the fluid stream flowing through the propeller. Additional control may also be accomplished by the throttle valve 20. Various amounts of blowing for a given nozzle setting may be had by regulating the throttle valve. Thus, the throttle valve provides a control within a control (i.e., the nozzle). It also provides a very rapid throttle device and a better shutoff feature, the restrictor ring 29 in the absence of a seal not providing a complete closure.

The control system 45 is operated by the control valve 73. By pressing the inner portion extend button 74, fluid is admitted to the back side of the motivators 61-1 through 4 to extend the rods 59-1 through 4 and thereby move the restrictor ring 50 away from the manifold. The restrictor ring outer portion 54 is carried with the inner portion 51. This movement opens the nozzle 58 to allow the fluid to escape from the nozzle. The nozzle 58 may be closed by pressing the retract button 75 which admits fluid to the opposite side of the motivators 61-1 through 4 to move the restrictor ring 50 toward the manifold to restrict or close the nozzle 58.

If the restrictor ring inner portion 51 is held stationary, provided also that the nozzle 58 is partially open, movement of multiple position lever 76 will admit fluid to one or more of the actuators 69-1 through 4 and cause the restrictor ring outer portion 54 to move relative to the inner portion 51. Depending on the actuators 69-1 through 4 to which fluid is admitted, the outer restrictor ring may be forced to cant so that the amount of discharge can be varied at any point about the circumference of the nozzle 58. The control system 45 can thus be utilized to restrict blowing in the manner of control system 15, and additionally provide uneven lateral blowing. A spring arrangement within the actuators is utilized to right the outer portion 54 with respect to the inner portion 51 upon release of the control lever.

Figure 2:
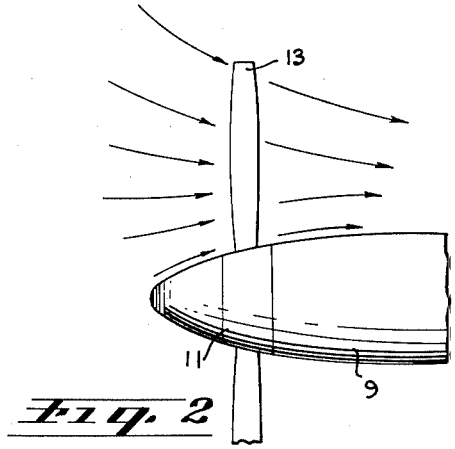
FIG. 2 is a fragmentary elevational view of the nacelle and propeller assembly of an aircraft showing the flow pattern through a propeller with conventional propeller blade loading.

Various aerodynamic accomplisments are provided with uniform blowing around the propeller disc with control systems such as 15 and 45. Among them is an increase in thrust. The fluid discharge from the nozzles redistributes the flow through the propeller. This is best illustrated by the arrows showing the conventional flow pattern in FIG. 2, and the arrows in FIG. 3 showing the flow pattern of the redistributed air. With this arrangement the bulk of the fluid drawn through the propeller is at a station approximately seven-tenths the distance from the spinner to the end of the propeller. It is well known that the propeller in the vicinity of the seventy percent station is most efficient, providing more work on the fluid and thus an increase in thrust.

The slipstream velocity is reduced and hence drag on the afterbody of the engine or fuselage. This has been proven by tests in a wind tunnel and is also apparent from a comparison of the flow distribution shown in FIGS. 2 and 3.

The system relieves and in some cases eliminates recirculation flow for some configurations (i.e., tilt wing or propeller) of vertical takeoff and landing aircraft. For these types of aircraft the fluid is drawn through the propeller at a great velocity adjacent to the nacelle or propeller shaft housing and drawn back through in a circular pattern outside the tips thereof. As the aircraft ascends from or approaches the ground it stirs up dirt and debris which is drawn back through the propeller and into the intake of the engine, particularly in a turboprop engine. As shown in FIG. 1, on the right side, the flow pattern is spread out by the lateral blowing providing a relieving of or solution to the problem.

The control system relieves or eliminates blade loading instability during descent condition in vertical takeoff and landing aircraft. During descent a condition occurs where there are essentially equal and opposite velocities. At this condition the vortex ring reaction occurring at the tips of the propeller is at a maximum, causing the blade loading instability. These vortex rings are broken up by the lateral blowing alleviating the instability.

The control system relieves or eliminates stall flutter which occurs at slow forward speeds or at static conditions. This is best explained by FIGS. 6 and 7 wherein it can be seen in FIG. 6 that at static condition the tip of the propeller stalls and actually creates a reverse thrust. By redistributing the air flow with lateral blowing the stall flutter is removed. The thrust loading then approaches that shown in FIG. 7 which is that of cruise condition and high efficiency.

Obviously, rapid thrust control is obtainable by merely throttling the flow through the nozzle. This can be done mechanically or with a fluid and valve system as described.

Steering in the lateral direction is easily accomplished on multiengine aircraft. By reducing or increasing the thrust, accomplished by means of the control system, on the engine on one side of the aircraft it will turn because of the unbalanced thrust.

The arrangement reduces slipstream rotation for single rotation propellers and thus increases efficiency. The fluid as it is pulled through the propeller is twisted because of the rotation thereof. This produces thrust vectors oblique to those desired. The lateral blowing tends to take the twist out of the flow stream eliminating many of the oblique vectors.

Existing propeller blade designs are somewhat of a design compromise because of the necessity of it having to function at accepted efficiencies at both low and high speeds. The geometric pitch (twist) of the propeller may be designed for cruise speed with this invention because of the increased efficiency at static or slow speeds obtainable with lateral blowing.

With the control system 45 the above advantages may be accomplished, as well as additional benefits. Essentially all propeller forces and moments except thrust and torque may be eliminated. The operation of a propeller with its thrust axis inclined relative to the inflow (i.e., flight path) results in the angle of attack of the propeller blade continuously changing as it rotates. For this reason helicopters use mechanisms for articulating the blades. By providing uneven lateral blowing the propeller blades can be made to encounter the same condition at all times providing only thrust and torque. This greatly reduces vibrations and allows a propeller design requiring less material. This also results in more uniform flow over afterbodies making possible the utilization of smaller control surfaces such as rudders, elevators and ailerons. Obviously, if the above propeller forces can be eliminated, they can be induced to provide control at a low speed which includes directional movement particularly in single engine aircraft.

It will be apparent from the above description that many modifications are possible in the light of the above teaching. It is, therefore, to be understood that within the scope of the appended claims the invention may be practiced otherwise than as specifically described herein.

What is claimed is:

1. A propeller blade loading control comprising: aircraft propulsion means having a propeller blade; a torus-like manifold surrounding said propulsion means within the periphery of said propulsion means, said manifold having a bearing member; a restrictor ring movable on said bearing member in said manifold, said restrictor ring having a first portion movable on said bearing member and a second portion universally movable on said first portion; said manifold and restrictor ring together being shaped to form a nozzle to direct fluid generally normal to the fluid flow through said propeller; first operator means for moving said first and second portions together to uniformly restrict fluid flow through said nozzle; second operator means to cant said upper portion relative to said lower portion to unevenly restrict fluid flow through said nozzle to assist steering; and means for supplying fluid to said manifold.

2. A propeller blade loading control as in claim 1 wherein said first and second operator means includes fluid actuators, and valve means for controlling said fluid actuators.

3. A propeller blade loading control comprising: aircraft propulsion means having a propeller blade; fluid supply means; nozzle means for directing a fluid stream aft of the propeller to affect the air inflow velocity distribution; means for conveying fluid between said supply means and said nozzle, said nozzle means having a restrictor ring movable to vary the degree of discharge from said nozzle, said restrictor ring having universal mounting means, differential means for canting said restrictor ring to position said restrictor ring whereby an uneven fluid stream is discharged from said nozzle to control steering.

4. A propeller blade loading control comprising: aircraft propulsion means having a propeller blade; fluid supply means; nozzle means for directing a fluid stream aft of the propeller to affect the air inflow velocity distribution; means for conveying fluid between said supply means and said nozzle, said nozzle means having a restrictor ring movable to vary the degree of discharge from said nozzle, said restrictor ring having universal mounting means, differential means for canting asid restrictor ring to position said restrictor ring whereby an uneven fluid stream is discharged from said nozzle to control steering, and said differential means includes a fluid actuator system.

5. A propeller blade loading control comprising: aircraft propulsion means having a propeller blade free to rotate about an axis; a source of fluid, means for compressing said fluid, said compressing means disposed aft of said propeller blade; nozzle means for directing said compressed fluid aft of said propeller in a plurality of directions, simultaneously, all contained within a plane transverse to said axis to affect the fluid inflow velocity distribution; means for conveying fluid from said compressing means to said nozzle means, said nozzle means having a restrictor ring movable to vary the degree of discharge from said nozzle means, said restrictor ring having universal mounting means; and differential means for canting said restrictor ring to position said restrictor ring whereby an uneven fluid stream is discharged from said nozzle means to control steering.

6. A propeller blade loading control comprising: aircraft propulsion means having a propeller blade free to rotate about an axis; a source of fluid, means for compressing said fluid, said compressing means disposed aft of said propeller blade; nozzle means for directing said compressed fluid aft of said propeller in a plurality of direction, simultaneously, all contained within a plane transverse to said axis to affect the fluid inflow velocity distribution; means for conveying fluid from said compressing means to said nozzle means, said nozzle means having a retrictor ring movable to vary the degree of discharge from said nozzle means, said restrictor ring having universal mounting means; and differential means, including a fluid actuator system, for canting said restrictor ring to position said restrictor ring whereby an uneven fluid stream is discharged from said nozzle means to control steering.

7. A high efficiency thrust system for aircraft, comprising: a body; a propeller carried by said body for rotation about an axis to create a slipstream through said propeller and produce thrust; and means to modify the path of said slipstream including an annular discharge nozzle located aft of said propeller in a plane transverse to said axis and adapted to discharge fluid radially outward in the form of a planar sheet transverse to said axis; means independent of said propeller to supply fluid at superatmospheric pressure to said nozzle; said planar sheet of fluid contacting said slipstream and diverting at least the central portion thereof radially outward toward the high efficiency portions of the blades of said propeller; means to vary the rate of discharge from said nozzle independently of the movement of said aircraft or rate of rotation of said propeller; and means to vary the discharge area of said nozzle unsymmetrically about its periphery to produce unsymmetrical modification of said slipstream.

8. A high efficiency thrust system for aircraft, comprising: a body; a propeller carried by said body for rotation about an axis to create a slipstream through said propeller and produce thrust; and means to modify the path of said slipstream including nozzle means located aft of said propeller and adapted to discharge fluid at superatmospheric pressure radially outward in a plurality of directions simultaneously in a plane transverse to said axis to contact the slipstream through said propeller and divert it radially outward toward the blade tips of said propeller; and means to supply fluid to said nozzle means; and means to vary the discharge area of said nozzle means unsymmetrically about said axis to produce unsymmetrical modification of said slipstream.

References Cited in the file of this patent

UNITED STATES PATENTS

| | | |
|---|---|---|
| 1,103,188 | Filippi | July 14, 1914 |
| 2,270,912 | Theodorsen | Jan. 27, 1942 |

FOREIGN PATENTS

| | | |
|---|---|---|
| 11,784 | Great Britain | May 16, 1911 |